United States Patent [19]
Leitch et al.

[11] Patent Number: 5,824,249
[45] Date of Patent: Oct. 20, 1998

[54] MODULAR MOLDING METHOD AND ASSOCIATED MOLD

[75] Inventors: James Leitch; Richard Olds, both of Madison, Conn.

[73] Assignee: Dow-UT Composite Products, Inc., Wallingford, Conn.

[21] Appl. No.: 608,490

[22] Filed: Feb. 28, 1996

[51] Int. Cl.$^6$ .................................................. B29C 33/30
[52] U.S. Cl. ...................... 264/219; 264/328.1; 425/85; 425/190; 425/192 R; 425/195; 249/102
[58] Field of Search ............................... 264/219, 328.1; 249/102; 425/85, 190, 192 R, 195

[56] References Cited

U.S. PATENT DOCUMENTS

| | | | |
|---|---|---|---|
| 3,999,930 | 12/1976 | Telbizoff | 425/394 |
| 4,015,872 | 4/1977 | Loznak et al. | 294/61 |
| 4,093,413 | 6/1978 | Schollhorn et al. | 425/110 |
| 4,202,522 | 5/1980 | Hanas et al. | 249/102 |
| 4,629,409 | 12/1986 | Satoh et al. | 425/139 |
| 4,674,053 | 6/1987 | Bannai et al. | 364/476 |
| 4,910,067 | 3/1990 | O'Neill | 428/139 |
| 5,012,426 | 4/1991 | Harada et al. | 364/476 |
| 5,062,052 | 10/1991 | Sparer et al. | 364/473 |
| 5,132,069 | 7/1992 | Newton | 264/257 |
| 5,216,617 | 6/1993 | Kamiguchi et al. | 364/476 |
| 5,229,952 | 7/1993 | Galloway et al. | 364/476 |
| 5,236,321 | 8/1993 | Newton | 425/123 |
| 5,275,768 | 1/1994 | Inaba et al. | 264/40.1 |
| 5,301,930 | 4/1994 | Magario | 364/476 |
| 5,306,448 | 4/1994 | Kromrey | 264/29.5 |
| 5,316,707 | 5/1994 | Stanciu et al. | 264/40.1 |

FOREIGN PATENT DOCUMENTS

| | | |
|---|---|---|
| 0465399 | 1/1992 | European Pat. Off. . |
| 2636002 | 3/1990 | France . |
| 3542840 | 6/1987 | Germany . |
| 3626019 | 11/1987 | Germany . |
| 56-010439 | 2/1981 | Japan . |
| 61-21010 | 9/1986 | Japan . |
| 2022015 | 1/1990 | Japan . |
| 6155483 | 6/1994 | Japan . |
| 2263085 | 7/1993 | United Kingdom . |

*Primary Examiner*—David W. Wu
*Attorney, Agent, or Firm*—Nims, Howes, Collison, Hansen & Lackert

[57] ABSTRACT

A method for fabricating molded parts utilizing a plurality of mold details having respective molding surfaces defining respective contours. The method selecting a first group of the mold details and disposing the selected mold details adjacent to one another in a first predetermined spatial relationship so that the molding surfaces of the selected mold details are contiguous, to define a first molding cavity for producing a first desired molded part. A hardenable polymeric material is injected into the molding cavity and hardened to form the desired molded part. Various combinations of mold details can be assembled to produce multiple parts in a common mold frame.

22 Claims, 4 Drawing Sheets

MODULAR MOLDING METHOD AND ASSOCIATED MOLD

TECHNICAL FIELD

This invention relates to a molding method and an associated mold assembly, and more particularly to methods for molding composite parts using separate mold details which are assembled to produce a mold set.

BACKGROUND OF THE INVENTION

In conventional composite molding processes, each different part to be produced requires a dedicated standard match mold, which results in a plethora of large molds which have minimal differences but which necessitate the reservation of large volumes of storage space. Moreover, to produce each part requires a separate dedicated fabrication work station, to conform to the individual mold, which is inefficient, as the total number of individual tools and processing stations required are substantial, while flexibility is limited.

For example, to produce a fiber reinforced composite part, it is common to design a dedicated matched mold having a cavity of the prescribed shape and size. Precision is important, as the resultant part must be accurate in all its dimensions since these parts are later assembled to produce structures, such as an aircraft wing.

One method preferred for producing such parts is by resin transfer molding. In this process, dry fiber plys are assembled, shaped and placed in the mold cavity, prior to resin injection. Using this method, complete resin infiltration and uniform curing results.

However, using existing manufacturing processes, part through put is limited because the mold remains associated with the injection apparatus for a long time and, to produce multiple parts, one must have available multiple matched molds. Each injection station presently can handle very few mold variations, requiring multiple injection stations to produce the various parts.

SUMMARY OF THE INVENTION

It is an object of the present invention is to provide a new molding methodology which provides increased part yields and increased efficiency, as well as improved capacity and equipment utilization, in comparison to conventional molding processes utilizing dedicated standard match molds.

Another object is to provide a molding method which allows for the processing of different parts in one common work station, rather than having each part produced in a dedicated work station.

A further object is to provide a molding method which utilizes mold detail families where selective mold details may be assembled to produce mold cavities adaptable to producing a number of different parts.

Yet another object is to provide a molding method which improves the manufacture of resin transfer molded composite products, which incorporate fiber reinforcement.

An additional object of the present invention is to provide a molding method which increases manufacturing flexibility and improves control over the entire molding processes.

These and other objects are achieved by utilizing a mold detail family which is established to produce different mold cavities for producing different molded parts. These details are interchangeable and can fit in a common frame. Various mold details can be selected and fit together to produce molds suitable for producing a number of different parts, rather than having the standard match mold which can make only one part. Accordingly, selected mold details are assembled off line, loaded onto a carrier plate and transported to a flexible molding station where a dry fabric preform, which forms the reinforcement for the part, may be inserted and these are loaded into a common mold frame for resin injection. By using a common frame, the major equipment can be designed for modular processing, each handling stage designed to accommodate the common frame. Consequently, different parts can be produced in one of several common stations, rather than having each part produced in a dedicated work station. Flexible molding of various parts is achieved, with part yields increased, and the injection stations operated at maximum efficiency.

The inventive method utilizes a mold detail family comprising a plurality of mold details having respective molding surfaces defining respective contours. A first group of mold details are selected from the detail family to form a first part, and disposed adjacent to one another in a first predetermined relationship so that the molding surfaces of the selected mold details are contiguous, to define a first mold cavity for producing the first part. The selected mold details are placed into a mold frame which holds the mold details together. After placing the selected mold details in the mold frame, a cover may be placed over the mold frame. A hardenable polymeric material is injected into the mold cavity to form the first part and cured.

In one embodiment of the present invention, a portion of the selected mold details are assembled to one another as a subassembly outside of the frame, these used as a separate mandrel assembly to assist in the assembly of a fiber preform, the preform and subassembly loaded into the frame prior to injection.

A mold assembly in accordance with the present invention comprises a mold frame and a plurality of mold details having respective molding surfaces defining respective part contours. The mold details are removably disposed in the frame so that the molding surfaces of the mold details are each contiguous with the molding surface of at least one other of the mold details, thereby defining a molding cavity for producing a desired molded part. The mold assembly further comprises a cover removably coupled to the mold frame.

In accordance with the present invention, a molding or injecting station may have a plurality of clamps in respective clamping zones for accommodating mold frames of different lengths. Generally, the longer the mold frame, the more clamping zones are utilized. Each station is thus capable of processing different length frames, without necessitating any retooling, the stations maintaining a high on-line time, to maximize the production of parts.

A flexible molding method in accordance with the present invention is especially advantageous in molding a plurality of different parts such as aircraft frame or fuselage components which correspond to different airplane structures. For example, tail sections of two related aircraft models may have the same base configuration, but one may be longer than the other.

A flexible molding method in accordance with the present invention is particularly directed to improving the manufacturing of resin transfer molded composite products. The method utilizes production modules designed to accommodate a common frame which when integrated together provide for increased yield and higher throughput. The method enables processing of a wide variety of parts of varying production rates or quantities simultaneously, thereby increasing manufacturing flexibility and improving control over the entire molding processes. Using a detail family tooling approach reduces the total number of individual tools and processing stations required and increases flexibility as compared to that of processing individually tooled molds. The flexible molding approach of using mold frames, mold details and carriers rather than standardized matched molds enables a mold frame to be sized to accommodate a detail family size. Individual details within the family have their own particular dies, i.e., their respective groups of particular mold details assembled in predetermined configurations to generate the respective molding cavities. Another advantage of a flexible molding cell molding technique in accordance with the present invention is the asynchronous processing of preform assembly operations, molding operations, cooling operations, and disassembly and demolding operations. Also, the costs of multi-purpose, non-dedicated molds are less than the costs of dedicated large/single part molds and associated molding equipment.

DETAILED DESCRIPTION OF THE INVENTION

Figure 1:
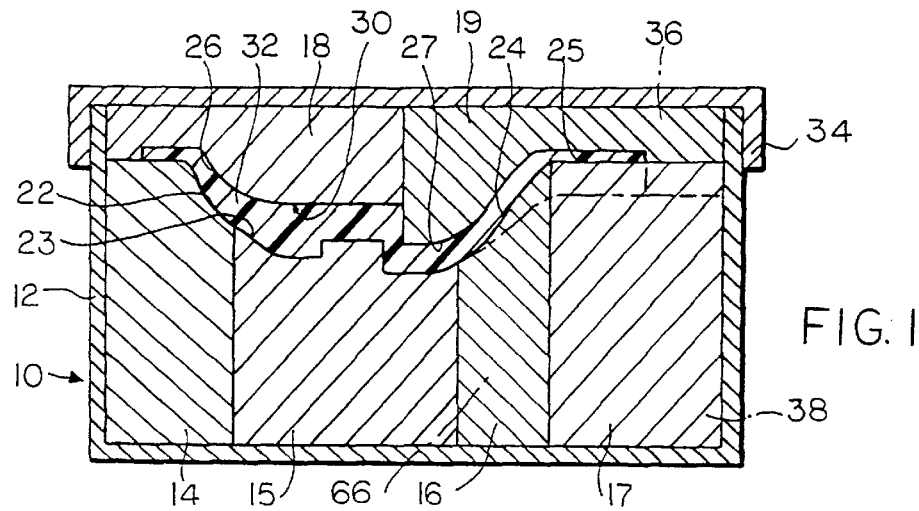
FIG. 1 is a schematic cross-sectional view of a mold utilized in a molding process in accordance with the present invention.
Figure 2:
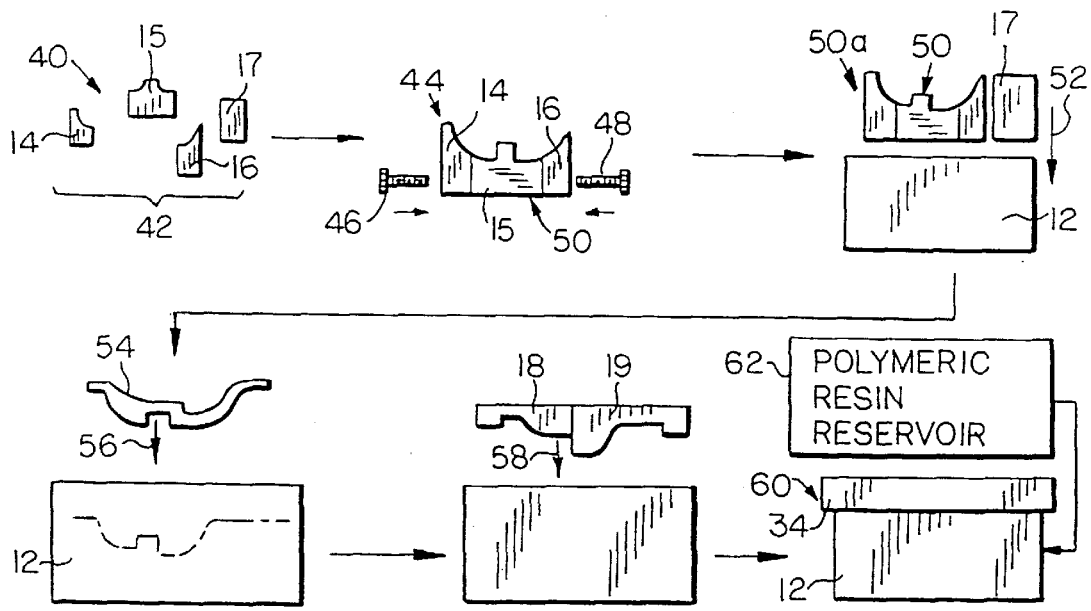
FIG. 2 is a diagram illustrating a typical example of a sequence of steps in a molding process in accordance with the present invention.

Referring to FIG. 1, a mold assembly 10 comprises a mold frame or casing 12 and a plurality of modular mold details 14–19 having respective molding surfaces 22–27 defining respective contours. Mold details 14–19 are removably disposed in frame 12 so that molding surfaces 22–27 are mutually contiguous, i.e., so that each molding surface 22–27 is contiguous with at least one other molding surface 22–27, thereby defining a molding cavity 30 for producing a desired molded part 32 (FIG. 2). Mold assembly 10 further comprises a cover or lid 34 removably coupled to mold frame 12.

Mold details 14–19 are elements of a detail family including other mold details, e.g., 36 and 38. Mold details 14–19, 36, and 38 can be placed in other combinations to form differently configured or differently dimensioned molding cavities for forming different molded parts. For instance, mold details 36 and 38 may be substituted for mold details 19 and 17, respectively, to form a different molded part (not shown) having the same basic shape characteristics as molded part 32.

FIG. 2 illustrates an exemplary sequence of steps for producing parts in accordance with the invention.

In an initial step 40, a first detail group comprising mold details 14–17 is selected from a larger number of selectable mold details including details 14–19, 36 and 38. In step 44, details 14–16 are connected to one another by bolts or pins 46 and 48 to form a rigid subassembly 50. Subassembly 50 and mold detail 17 are then placed in mold frame 12, as represented by an arrow 52. The selected mold details 14–17 are placed adjacent to one another in a predetermined spatial relationship so that molding surfaces 22–25 are mutually contiguous to define part of mold cavity 30 for producing molded part 32.

After placing mold details 14–17 in mold frame 12, a fiber preform 54 is positioned over the mold surfaces 22–25, as indicated by an arrow 56 in FIG. 2. Subsequently, mold details 18 and 19 are disposed over preform 54, as indicated by an arrow 58. These details define the upper part of the mold cavity 30, to complete the shape definition of the cavity, the fiber preform 54 positioned in mold cavity 30 (FIG. 1).

A cover 34 is placed over frame 12, as shown in step 60. The cover 34 is clamped to mold frame 12 which may result in the application of compressive force to preform 54 to conform the preform to mold cavity 30. Generally, where a high fiber density is required in the ultimate part, the preform 54 is slightly overdimensioned, relative to cavity 30, prior to its compression into cavity 30.

While the invention is described in relation to the utilization of a fiber preform, it is of course understood that such preforms are not needed in all composite parts, but rather the invention is adaptable to producing parts using an RTM process that may require high fiber densities. To that end, the subassembly of mold details may perform the additional function of providing a mandrel surface for forming the fiber layers into the correct shape, rather than having a separate mandrel for preforming the fiber layers. Thus, fiber layers could be formed over details 14–17, to produce the preform 54, and these together loaded into the mold frame 12.

After clamping the cover 34 over frame 12, a hardenable polymeric material from a reservoir 62 is injected into molding cavity 30. Once filled, the injected polymeric material is hardened to form the desired molded part 32, which is then removed from molding cavity 30. Some of the mold details may be removed from frame 12 to enable the extraction of molded part 32.

Once the molded part 32 is removed, a second detail group is selected. The second group is different from the first group but may include one or more mold details from the first group. As shown in FIG. 1, the second detail group may include original mold details 14, 15 and 18, while mold details 36, 38 and 66 shown by phantom lines, are substituted for details 19, 17 and 16, respectively.

Figure 2A:
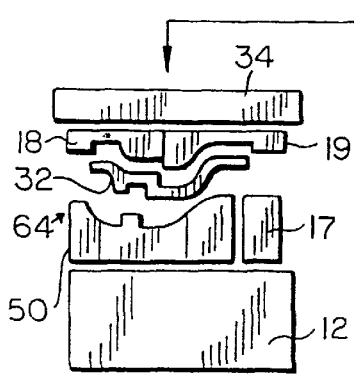
FIG. 2a is an alternative step of the invention.
Figure 2A:
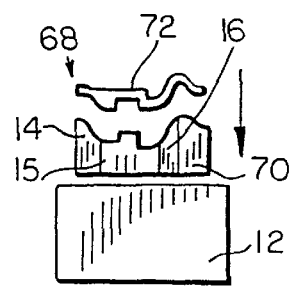

As shown in FIG. 2a, the mold details of the second group may include details 14–16, while a different detail 70 is substituted for detail 17. These are assembled and placed into mold frame 12, as a substitute for step 50a in FIG. 2. A fiber preform 72 is positioned over these mold details in the frame to produce a different part. The other processing steps remain the same.

The disassembly of the selected mold details 14–19 of the first group may include removing all the selected mold details 14–19 of the first group from the mold frame 12, though in some cases, only some of the mold details, e.g., details 18 and 19 (FIG. 1), need be removed from frame 12 prior to the extraction of the molded part 32. Of course, the disassembly of the selected mold details 14–19 of the first group may include disconnecting the details by removing bolts 46 and 48.

The frame used for holding the second group of mold details may be the same as or different from the frame used for holding the first group of mold details, but of course, a common frame is preferred. Most preferred is a frame of common width, but having, for example, three different lengths. In such a case, where the mold cavity formed by the details is smaller than the available space in the frame, one or more "filler" mold details (not shown) may be used to optimize the fit of the mold details into the mold frame. By having a common dimension, such as width, all handling equipment, and each processing station can be designed to that dimension. Thus each station can be used to produce multiple parts.

It will be understood that alternative sequences of steps may be followed in accordance with the invention. For example, the disposition of selected mold details 14–19 adjacent to one another may be performed by placing mold details 14–19 into mold frame 12, with the pins, bolts or other connectors used to couple the mold details to each other after assembly in the frame.

As another alternative, after extraction of a hardened molded part from mold frame 12 and removal of at least one of the selected mold details 14–19 from frame 12, a new molding cavity may be generated conforming to another desired molded part, either by substituting a different detail or by simply the removal of the detail. Of course, all of the details may be removed and an entirely different group of mold details selected to produce a different part.

Figure 3:
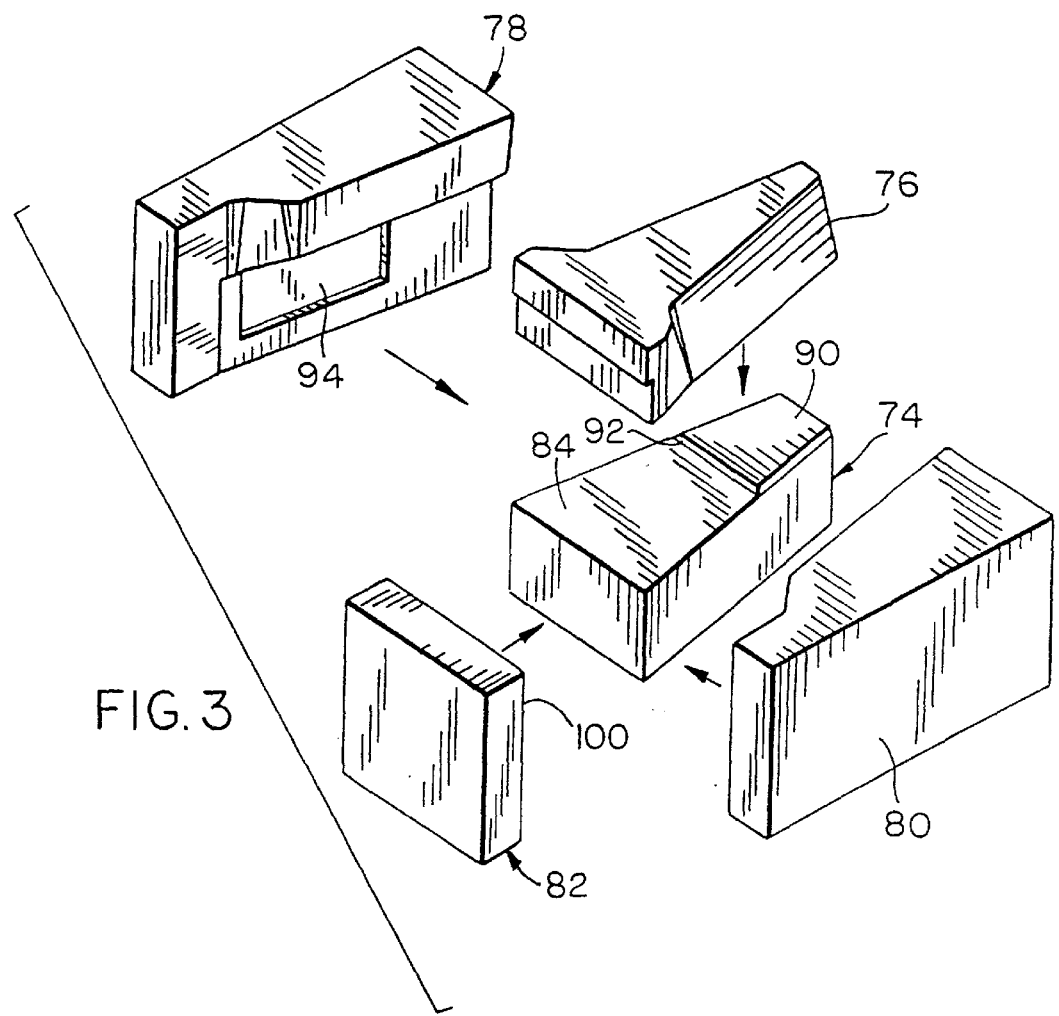
FIG. 3 is an exploded perspective view of a mold assembly in accordance with the invention.
Figure 4:
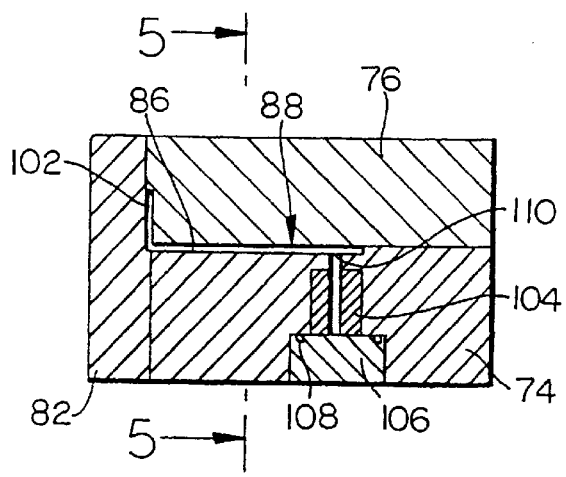
FIG. 4 is a cross-sectional view of the mold assembly of FIG. 3, in an assembled configuration.
Figure 5:
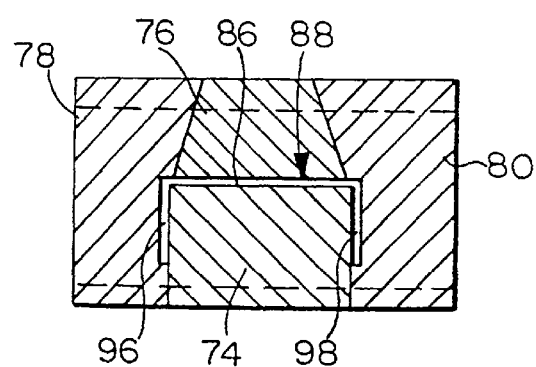
FIG. 5 is a cross-sectional view taken along line V—V in FIG. 4.

As illustrated in FIGS. 3–5, a particular mold assembly for carrying out a modular molding technique is described. A lower mold detail 74, an upper mold detail 76, two side details 78 and 80, and an end detail 82 are selected. Lower mold detail 74 is formed with a lower land area forming a molding surface 84 corresponding to a main body 86 of a molding cavity 88. Lower mold detail 74 has a pin area 90 and a positive stop 92. Side details 78 and 80 are each provided with a pocket 94 for forming a respective side flange 96 and 98 of molding cavity 88. End detail 82 is likewise provided with a recessed area 100 forming an end flange 102 of molding cavity 88. As shown in FIG. 4, lower detail 74 has a bushing 104 adjacent a plug 106 with an O-ring groove 108. Bushing 104 defines a feed channel 110 for providing polymeric resin to the cavity 88.

As described previously one or both side details 78 and 80 may be replaced by other mold details with differently dimensioned pockets to form a mold cavity for a part having different dimensions.

Figure 6:
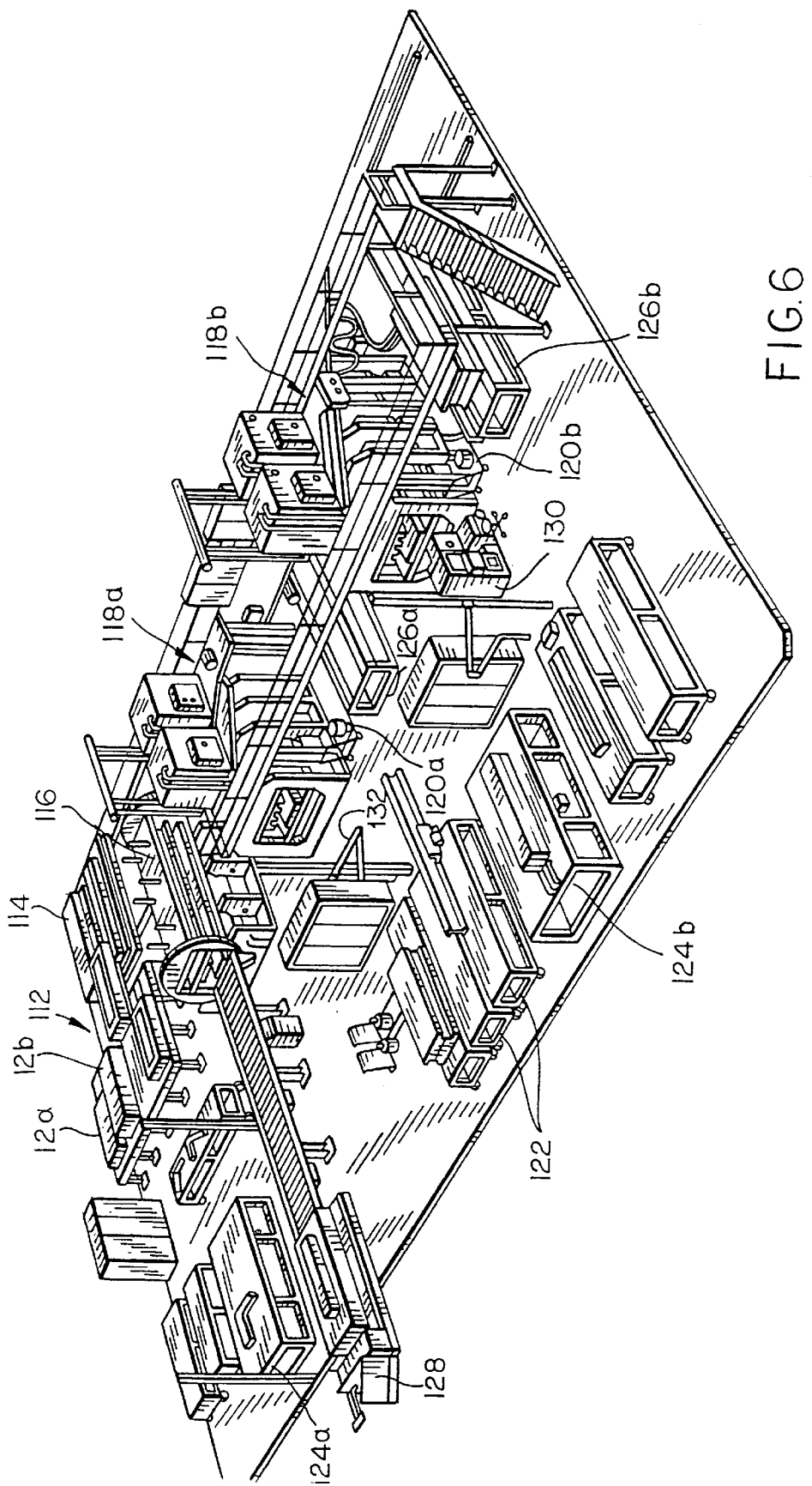
FIG. 6 is a perspective view of a manufacturing facility for carrying out a molding process accordance with the present invention.

FIG. 6 shows a manufacturing facility for carrying out a molding process as described above. The selected mold details are assembled and placed into a frame 12a or 12b at an assembly station 112. Track mounted carts 114 are provided for transporting individual or interconnected mold details to positions next to frames 12a. The selected group of mold details are placed into a mold frame 12a to form a desired molding cavity. A fiber preform 72 is placed into the molding cavity, and then the frame 12a with its cover is conveyed to a rotation station 116 where the mold assembly is inverted. The inverted mold assembly is then transferred to a pre-heat station. This reduces the amount of time that the mold is in contact with the injection station, maximizing equipment utilization and part throughput. When an injection station becomes available, the mold assembly is moved to the available clamping and resin injection station 118a or 118b where the mold assembly is clamped and a hardenable polymeric material injected into the molding cavity. The fluidic resin material may be injected from a portable injection cart 120a or 120b.

After injection of the resin material into the molding cavity and partial hardening of the resin material, the mold assembly is removed from the selected clamping and injection station 118a, 118b and disposed on a mobile cooling cart 122, to release the injection station for production of another part. Subsequently, after cooling, the mold assembly is taken apart at a disassembly table 124a, 124b.

The manufacturing facility of FIG. 6 further includes set-up racks 126a, 126b with utility connectors (not shown) and preheating coils (not shown), an electric mobile cart 128, a control station 130, and jib cranes 132. Set-up racks 126a, 126b are configured to accommodate mold frames of variable lengths. For example, the racks 126a, 126b are provided with a multiplicity of individually operable clamps (not shown) enabling frames of different lengths to be secured to a platform.

Since detail families are used with a common group of frames having the same width, all of this equipment can be used to produce hundreds of different parts, in any sequence. It is not necessary to retool any station to produce a different part substantially increasing the time available for producing parts, with significant savings in equipment costs and processing time.

Figure 7:
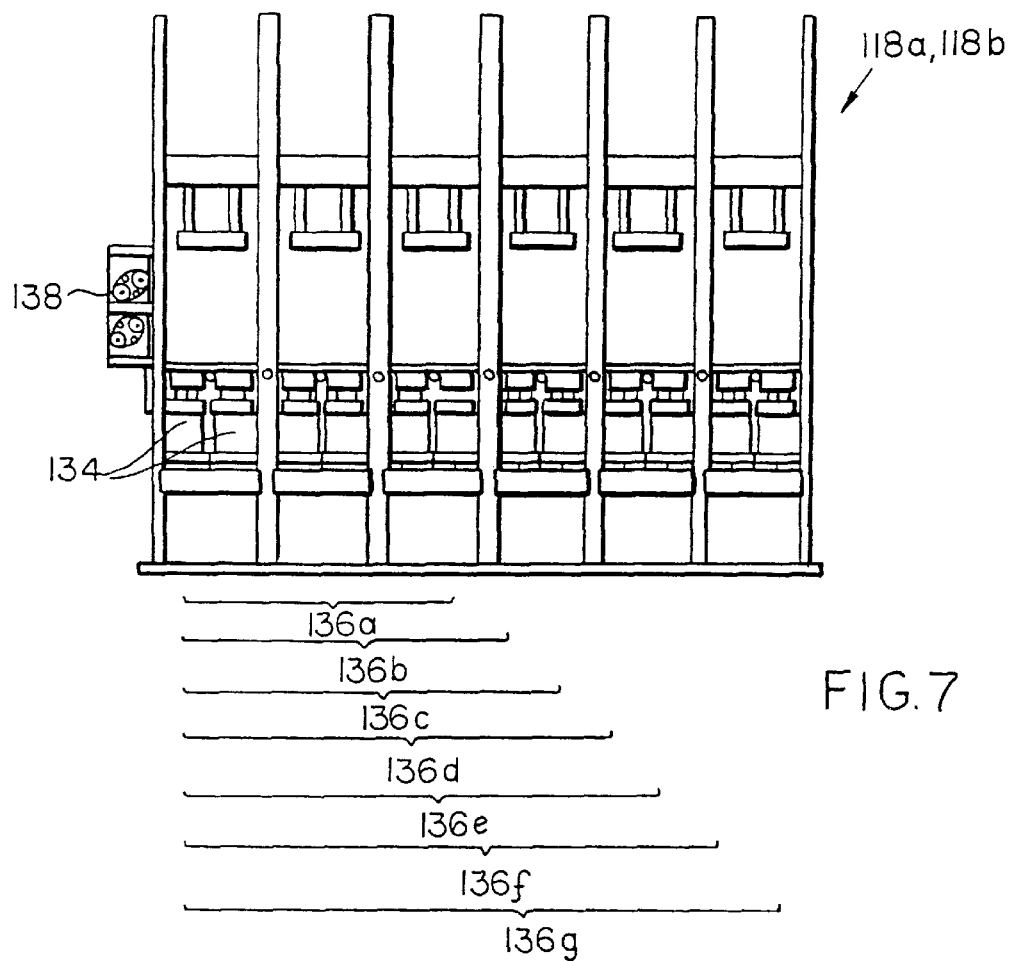
FIG. 7 is a side elevational view of a mold clamping and resin injection station in the manufacturing facility of FIG. 6.
Figure 8:
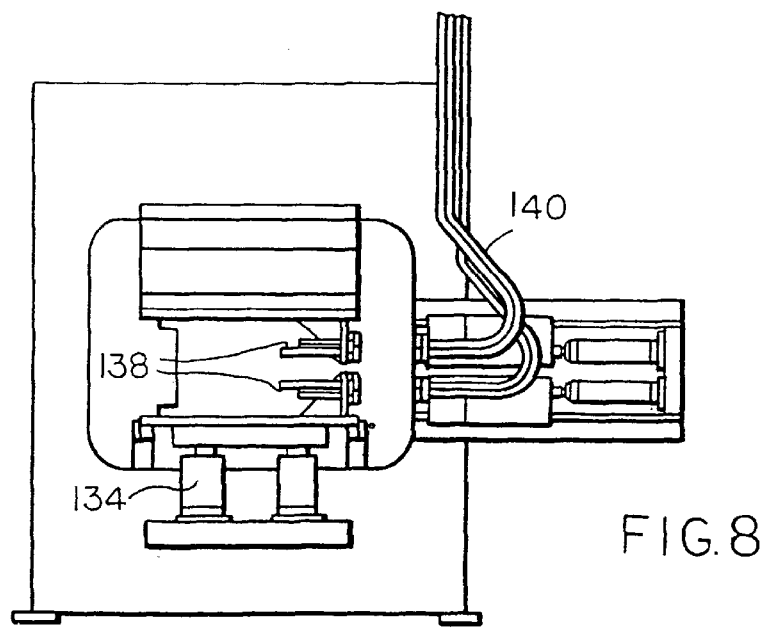
FIG. 8 is a front elevational view of the mold clamping and resin injection station of FIG. 7.

As illustrated in FIGS. 6, 7 and 8, each clamping and resin injection station includes a plurality of hydraulic clamping cylinders 134. Hydraulic cylinders 134 are separately operable to selectively clamp mold frames of different lengths. More specifically, cylinders 134 are operable in groups to form different clamping zones 136a–136g. Injection nozzles 138 are connected to hoses 140 for directing the fluidic resin material to a molding cavity of a clamped mold assembly.

Although the invention has been described in terms of particular embodiments and applications, one of ordinary skill in the art, in light of this teaching, can generate additional embodiments and modifications without departing from the scope of the claimed invention. For example, a mold assembly in accordance with the invention may form a plurality of molding cavities. Accordingly, it is to be understood that the drawings and descriptions herein are proffered by way of example to facilitate comprehension of the invention and should not be construed to limit the scope thereof.

What is claimed is:

1. A fabrication method consisting essentially of:

providing a mold detail family comprising a plurality of mold details having respective molding surfaces defining respective contours;

selecting a first subset of said mold details from the detail family to form a first part;

locating the selected first subset of mold details adjacent to one another in a first predetermined spatial relationship so that the molding surfaces of the selected first subset of mold details are contiguous, to define a first molding cavity for producing the first part;

placing the selected first subset of mold details into a mold frame;

injecting a hardenable polymeric material into the first molding cavity to form the first part;

at least partially disassembling the selected first subset of mold details from one another;

extracting the first part from the first molding cavity;

selecting a second subset of mold details from the detail family to form a second part which differs in shape from the first part;

locating the selected second subset of mold details adjacent to one another in a second predetermined spatial relationship so that the molding surfaces of the selected mold details are contiguous to define a second molding cavity for producing the second part;

placing the selected second subset of mold details into the mold frame; and injecting a hardenable polymeric material into the second molding cavity to form the second part.

2. The method defined in claim 1, wherein at least one of the locating steps is performed prior to placing some of the selected mold details into the mold frame, thereby forming a sub-assembly which is thereafter placed into the mold.

3. The method defined in claim 1, wherein the disassembling of the selected first subset of mold details includes removing all the selected mold details of the first subset from the mold frame.

4. The method defined in claim 1, wherein the disassembling of the selected first subset of mold details comprises removing at least one of the mold details, the details not removed being among those selected to form the second subset of mold details.

5. The method defined in claim 1, wherein a fiber preform is inserted into at least one of the first or second molding cavities prior to the injection of the hardenable polymeric material.

6. The method defined in claim 5, further comprising applying compressive force to the preform to conform to the molding cavity.

7. The method defined in claim 1, wherein a mold cover is provided and placed over the mold frame before at least one of the injection steps.

8. The method defined in claim 1, wherein the step of locating the selected first or second subset of mold details adjacent to one another is performed by placing the selected mold details into the mold frame.

9. The method defined in claim 1, further comprising providing a flexible multizone clamping station capable of accommodating mold frames of different lengths and clamping the selected mold details in the mold frame during the injection of the polymeric material into the molding cavity.

10. The method of claim 1, wherein: a subassembly of several selected mold details of one of the first or second subset is produced to form a mandrel;

fiber layers are formed over the mandrel in the shape of the part corresponding to the subset of mold details in the mandrel, thereby forming a fiber preform; and the fiber preform is placed into the molding cavity for the part corresponding to the subset of mold details in the mandrel.

11. A method for fabricating molded parts consisting essentially of:

providing a detail family comprising a plurality of mold details having respective molding surfaces defining respective contours;

selecting a first subset of said mold details from the detail family to form a first part;

locating the selected first subset of mold details adjacent to one another in a first predetermined spatial relationship so that the molding surfaces of the selected mold details are contiguous, to define a first molding cavity for producing the first part;

placing the selected first subset of mold details into a mold frame;

injecting a hardenable polymeric material into the first molding cavity to form the first part;

at least partially disassembling the selected first subset of mold details from one another;

extracting the first part from the first molding cavity;

removing at least one of the selected mold details of the first subset from said mold frame;

by the removal of the at least one mold detail from the mold frame, defining a third molding cavity conforming to a third part, the third molding cavity being defined by surfaces on the mold details remaining in the mold frame;

injecting a hardenable polymeric material into the third molding cavity to form the third part.

12. The method defined in claim 11, wherein a fiber preform is inserted into at least one of the first or third molding cavities prior to the injection of the hardenable polymeric material.

13. The method defined in claim 12, wherein a compressive force is applied to the preform to conform the preform to the molding cavity.

14. The method defined in claim 11, wherein a mold cover is provided and placed over the mold frame before at least one of the injection steps.

15. The method defined in claim 11, wherein the step of locating the first subset of mold details adjacent to one another is performed by placing the selected mold details into the mold frame.

16. The method defined in claim 11, wherein a flexible multizone clamping station capable of accommodating mold frames of different lengths is provided and the selected mold details are clamped into the mold frame during the injection of the polymeric material into the molding cavity.

17. A method for fabricating molded parts consisting essentially of: providing a detail family comprising a plurality of mold details having respective molding surfaces defining respective contours;

selecting a first subset of said mold details from the detail family to form a first part;

locating the selected first subset of mold details adjacent to one another in a first predetermined spatial relationship so that the molding surfaces of the selected mold details are contiguous, to define a first molding cavity for producing the first part;

placing the selected first subset of mold details into a mold frame;

injecting a hardenable polymeric material into the first molding cavity to form the first part;

at least partially disassembling the selected first subset of mold details from one another;

extracting the first part from the first molding cavity;

inserting at least one additional mold detail into the mold frame;

by the insertion of the at least one mold detail, defining a fourth molding cavity conforming to a fourth part, the fourth molding cavity being defined by surfaces on the mold details in the mold frame;

injecting a hardenable polymeric material into the fourth molding cavity to form the fourth part.

18. The method defined in claim 17, wherein a fiber preform is inserted into at least one of the first or third molding cavities prior to the injection of the hardenable polymeric material.

19. The method defined in claim 18, wherein a compressive force is applied to the preform to conform the preform to the molding cavity.

20. The method defined in claim 17, wherein a mold cover is provided and placed over the mold frame before at least one of the injection steps.

21. The method defined in claim 17, wherein the step of locating the first subset of mold details adjacent to one another is performed by placing the selected mold details into the mold frame.

22. The method defined in claim 17, wherein a flexible multizone clamping station capable of accommodating mold frames of different lengths is provided and the selected mold details are clamped into the mold frame during the injection of the polymeric material into the molding cavity.

* * * * *